United States Patent
Sato

(10) Patent No.: US 9,444,349 B2
(45) Date of Patent: Sep. 13, 2016

(54) DC/DC CONVERTER, CONTROL CIRCUIT THEREOF, POWER SUPPLY, POWER ADAPTER AND ELECTRONIC APPARATUS USING THE SAME

(71) Applicant: ROHM CO., LTD., Kyoto (JP)

(72) Inventor: Yoshinori Sato, Kyoto (JP)

(73) Assignee: ROHM CO., LTD., Kyoto (JP)

( * ) Notice: Subject to any disclaimer, the term of this patent is extended or adjusted under 35 U.S.C. 154(b) by 268 days.

(21) Appl. No.: 14/102,032

(22) Filed: Dec. 10, 2013

(65) Prior Publication Data

US 2014/0160808 A1 Jun. 12, 2014

(30) Foreign Application Priority Data

Dec. 10, 2012 (JP) .................. 2012-268925

(51) Int. Cl.
*H02M 3/335* (2006.01)
*H02M 1/00* (2006.01)

(52) U.S. Cl.
CPC . *H02M 3/33507* (2013.01); *H02M 2001/0035* (2013.01); *Y02B 70/16* (2013.01)

(58) Field of Classification Search
CPC .................. H02M 3/33523; H02M 3/33507; H02M 2001/0035
See application file for complete search history.

(56) References Cited

U.S. PATENT DOCUMENTS

| 2005/0248965 A1* | 11/2005 | Yamada | H02M 3/33523 363/21.08 |
| 2007/0121258 A1* | 5/2007 | Hachiya | H02M 3/33507 361/18 |
| 2011/0204866 A1* | 8/2011 | Moon | H02M 3/33523 323/284 |
| 2012/0194162 A1* | 8/2012 | Lin | H02M 1/14 323/304 |
| 2013/0141947 A1* | 6/2013 | Sakurai | H02M 3/33523 363/21.16 |

* cited by examiner

*Primary Examiner* — Jessica Han
*Assistant Examiner* — Bart Iliya
(74) *Attorney, Agent, or Firm* — Cantor Colburn LLP

(57) ABSTRACT

A control circuit of a DC/DC converter having a transformer, a switching transistor, and a detector includes: a feedback terminal receiving a feedback voltage corresponding to an output voltage of the DC/DC converter; a current detection terminal receiving a detection voltage generated in the detection resistor; a conversion circuit configured to amplify, attenuate and/or level-shift at least one of the feedback voltage and the detection voltage, wherein a gain and/or a shift of the conversion circuit are variable; and a gain controller configured to control the gain and/or the shift of the conversion circuit.

20 Claims, 10 Drawing Sheets

DC/DC CONVERTER, CONTROL CIRCUIT THEREOF, POWER SUPPLY, POWER ADAPTER AND ELECTRONIC APPARATUS USING THE SAME

CROSS-REFERENCE TO RELATED APPLICATION

This application is based upon and claims the benefit of priority from Japanese Patent Application No. 2012-268925, filed on Dec. 10, 2012, the entire contents of which are incorporated herein by reference.

TECHNICAL FIELD

The present disclosure relates to a DC/DC converter.

BACKGROUND

Electronic appliances including televisions, refrigerators and so on are operated with external commercial AC (Alternating Current) power. Electronic apparatuses including laptop computers, mobile terminals, PDAs (Personal Digital Assistants) and so on are also operated with commercial AC power and their internal batteries may be charged with commercial AC power. Such electronic appliances and electronic apparatuses (hereinafter collectively referred to as electronic apparatuses) contain a power supply (inverter or an AC/DC converter) for converting commercial AC power into DC (Direct Current) power or an inverter is incorporated in an external power adapter (AC adapter) of the electronic apparatuses.

FIG. 1 is a circuit diagram showing a basic configuration of an inverter 100r. The inverter 100r includes, as main parts, a fuse 102, an input capacitor Ci, a filter 104, a diode rectifier circuit 106, a smoothing capacitor Cs and an isolated DC/DC converter 110r.

A commercial AC voltage $V_{AC}$ is input to the filter 104 via the fuse 102 and the input capacitor Ci. The filter 104 removes noise from the commercial AC voltage $V_{AC}$. The diode rectifier circuit 106 is a diode bridge circuit for full-wave rectification of the commercial AC voltage $V_{AC}$. An output voltage of the diode rectifier circuit 106 is smoothed by the smoothing capacitor Cs and is then converted into a DC voltage $V_{IN}$.

The DC/DC converter (flyback converter) 110r receives and steps down the DC voltage $V_{IN}$ at an input terminal P1 and supplies an output voltage $V_{OUT}$ stabilized to a target value to a load (not shown) connected to an output terminal P2.

The DC/DC converter 110r includes a control circuit 2r, a switching transistor M1, an output circuit 200 and a feedback circuit 210. The output circuit 200 includes a transformer T1, a first diode D1, a first output capacitor Co1, a detection resistor $R_S$, a second diode D2 and a second output capacitor Co2. The topology of the output circuit 200 is typical and therefore, explanation thereof will be omitted.

By the switching operation of the switching transistor M1, the input voltage $V_{IN}$ is dropped and the output voltage $V_{OUT}$ is generated. In addition, by adjusting a duty cycle of the switching operation of the switching transistor M1, the control circuit 2r controls a coil current Ip flowing into a primary winding W1 of the transformer T1 while stabilizing the output voltage $V_{OUT}$ to the target value.

The detection resistor $R_S$ is connected in series to the primary winding W1 of the transformer T1 and the switching transistor M1. A voltage drop (detection voltage) $V_{CS}$ proportional to the current Ip flowing into the primary winding W1 and the switching transistor M1 is produced in the detection resistor $R_S$. The control circuit 2r controls the current Ip flowing into the primary winding W1 on the basis of the detection voltage $V_{CS}$.

The feedback circuit 210 generates a feedback voltage $V_{FB}$ depending on the output voltage $V_{OUT}$ and supplies it to a feedback terminal (FB terminal) of the control circuit 2r. The feedback circuit 210 includes a shunt regulator 212 and a photo coupler 214. The shunt regulator 212 generates a feedback signal S11 having a level regulated such that an error between the output voltage $V_{OUT}$ and a predetermined target value becomes zero, and supplies the generated feedback signal S11 to a light emitting diode of the photo coupler 214. A photo transistor of the photo coupler 214 converts a light signal S12 emitted from the light emitting diode into the feedback voltage $V_{FB}$ depending on the feedback signal S11.

The primary side of the transformer T1 has an auxiliary winding W3 in addition to the primary winding W1. The auxiliary winding W3, the second diode D2 and the second output capacitor Co2 form a second DC/DC converter. In response to the switching operation of the switching transistor M1, a DC voltage $V_{CC}$ is produced in the second output capacitor Co2. The DC voltage $V_{CC}$ is supplied to a power terminal $V_{CC}$ ($V_{CC}$ terminal) of the control circuit 2r.

The control circuit 2r generates a pulse signal (switching output) $S_{OUT}$ alternating between an ON level corresponding to switch-ON of the switching transistor M1 and an OFF level corresponding to switch-OFF of the switching transistor M1. Then, the control circuit 2r supplies the switching output $S_{OUT}$ to a gate of the switching transistor M1. When a duty cycle of the switching output $S_{OUT}$ is adjusted, the output voltage $V_{OUT}$ is stabilized to a target value.

FIG. 2 is a circuit diagram showing a configuration of the control circuit 2r. The control circuit 2r includes a pulse modulator 10, a driver 20, a blanking circuit 40, a burst control circuit 50 and a voltage divider 80. The voltage divider 80 divides the feedback voltage $V_{FB}$ with a predetermined division ratio (for example, ¼). This division ratio is determined to supply sufficient power to a load (not shown) under heavy load conditions.

The blanking circuit 40 is provided to remove noise from the detection voltage $V_{CS}$. Specifically, immediately after the switching transistor M1 is switched on, the detection signal $V_{CS}$ is masked during a predetermined blanking interval. The blanking circuit 40 may be omitted.

The pulse modulator 10 generates a pulse signal $S_{PWM}$ based on a detection voltage $V_{CS}'$ outputted from the blanking circuit 40 and a feedback voltage $V_{FB}'$ outputted from the voltage divider 80. The pulse modulator 10 includes an oscillator 12, a comparator 14 and a SR flip-flop 16. The oscillator 12 generates a set signal $S_{SET}$ asserted (having a high level) with a predetermined cycle and inputs the set signal $S_{SET}$ to a set terminal S of the SR flip-flop 16. When the detection voltage $V_{CS}'$ reaches a lower one of the feedback voltage $V_{FB}'$ and a predetermined upper limit voltage $V_{LIM1}$ in an ON period of the switching transistor M1, the comparator 14 asserts (having a high level) a reset signal $S_{RESET}$ and outputs the asserted reset signal $S_{RESET}$ to a rest terminal R of the flip-flop 16. The pulse signal $S_{PWM}$ outputted from the SR flip-flop 16 transitions to an ON level of the switching transistor M1 whenever the set signal $S_{SET}$ is asserted, and transitions to an OFF level whenever the reset signal $S_{RESET}$ is asserted.

The driver 20 switches the switching transistor M1 based on the pulse signal $S_{PWM}$.

Under light load conditions, the DC/DC converter 110 causes the switching transistor M1 to perform an intermittent operation (burst operation) in order to increase efficiency by reducing power consumption. Specifically, the DC/DC converter M1 alternates between a switching period during which the switching transistor M1 is operated and a stop period during which the switching transistor M1 remains in an OFF condition.

The burst control circuit 50 is provided to detect the light load conditions of the DC/DC converter 110 and control the burst operation. Under the light load conditions where a load connected to the output terminal P2 is light, i.e., an output current is small, the output voltage $V_{OUT}$ is increased and the feedback voltage $V_{FB}$ is decreased. The burst control circuit 50 compares the feedback voltage $V_{FB}$ with a predetermined first burst threshold $V_{BURST1}$ and asserts (for example, having a high level) a light load detection signal S_BURST if the feedback voltage $V_{FB}$ is decreased to the first burst threshold $V_{BURST1}$. In addition, when the light load detection signal S_BURST is asserted, the burst control circuit 50 negates (for example, having a low level) the light load detection signal S_BURST if the feedback voltage $V_{FB}$ reaches a second burst threshold $V_{BURST2}$. While the light load detection signal S_BURST1 is being asserted, the pulse modulator 10 fixes the pulse signal $S_{PWM}$ to an OFF level and stops the switching operation of the switching transistor M1.

FIG. 3 is a view showing a relationship between the feedback voltage $V_{FB}$ and the peak value $V_{CS\_PEAK}$ of the detection voltage $V_{CS}$ in the control circuit 2r. In the control circuit 2r of FIG. 2, the feedback voltage $V_{FB}'$ (corresponding to ¼ of $V_{FB}$) outputted from the voltage divider 80 is compared with the detection voltage $V_{CS}$. Accordingly, the peak value of the detection voltage $V_{CS}$ becomes equal to ¼ of the feedback voltage $V_{FB}$. Regardless of the level of the feedback voltage $V_{FB}$, the peak value $V_{CS\_PEAK}$ of the detection voltage $V_{CS}$ is clamped at the upper limit voltage $V_{LIM1}$ and, accordingly, the coil current Ip is limited to an upper limit current $I_{LIM1}$ depending on the upper limit voltage $V_{LIM1}$.

FIG. 4 is a waveform diagram showing an operation of the DC/DC converter 110r under the light load conditions. A period from time A to time B represents a switching period of the switching transistor M1. When the switching output $S_{OUT}$ has a high level, the switching transistor M1 is switched on. When the switching transistor M1 is switched on, the current Ip begins to flow into the switching transistor M1 and the primary winding W1. The current Ip is increased with a certain slope with time, and accordingly, the detection voltage $V_{CS}$ is increased. During this period, energy is stored in the transformer T1. Then, when the coil current Ip reaches its peak value depending on the feedback voltage $V_{FB}$, the switching transistor M1 is switched off.

When the switching transistor M1 is switched off, a charging current flows through the secondary winding W2 of the transformer T1 and the diode D1, the output capacitor Co1 is charged, and the output voltage $V_{OUT}$ is increased. The energy stored in the transformer T1 is released by this charging current. This operation is repeated in the switching period A-B.

When the output voltage $V_{OUT}$ is increased in the switching period A-B, the feedback voltage $V_{FB}$ is decreased. Then, when the feedback voltage $V_{FB}$ is decreased to the first burst threshold $V_{BURST1}$, a stop period arrives. When the feedback voltage $V_{FB}$ reaches the second burst threshold $V_{BURST2}$ at time C, a switching time arrives and the switching operation of the switching transistor M1 resumes. FIG. 4 shows a case where $V_{BURST1}=V_{BURST2}$.

The present inventor has reviewed the DC/DC converter 110r and recognized the following problems. In the light load mode, the feedback voltage $V_{FB}$ and the detection voltage $V_{CS}$ shuttle within a range indicated by an arrow in FIG. 3. As described above, the division ratio of the voltage divider 80 is determined under the presumption of heavy load conditions. As a result, the peak value of the detection voltage $V_{CS}$ in the light load conditions, i.e., the peak value of the current Ip flowing into the switching transistor M1, is excessively increased. If the current Ip immediately after the DC/DC converter 110r transitions from the stop period to the switching period when the burst operation is increased, a variation of the magnetic flux density of the transformer T1 is increased to produce a ringing sound from the transformer T1.

In addition, if the peak value of the current Ip flowing into the switching transistor M1 is increased, there rises a problem of increased energy stored in the transformer T1 per cycle of the switching operation and an increase in the width of a ripple of the output voltage $V_{OUT}$ during the burst operation.

These problems and mechanisms causing the problems should not be regarded as a general awareness of those skilled in the art but should be considered to be uniquely recognize present inventor.

SUMMARY

The present disclosure provides some embodiments of a DC/DC converter which is capable of suppressing a ringing sound from a transformer and/or a ripple of an output voltage.

According to one embodiment of the present disclosure, a control circuit of a DC/DC converter having a transformer having a primary winding and a secondary winding, a switching transistor disposed on a current path of the primary winding of the transformer, and a detection resistor disposed on a path of the switching transistor, includes: a feedback terminal receiving a feedback voltage corresponding to an output voltage of the DC/DC converter; a current detection terminal receiving a detection voltage generated in the detection resistor; a conversion circuit configured to amplify, attenuate and/or level-shift at least one of the feedback voltage and the detection voltage, wherein a gain and/or a shift of the conversion circuit are variable; a pulse modulator configured to generate a pulse signal pulse-modulated such that an output voltage of the DC/DC converter approaches a target value, based on the feedback voltage and the detection voltage passed through the conversion circuit; a driver configured to drive the switching transistor based on the pulse signal; a burst control circuit configured to control a switching period during which the switching transistor is switched and a stop period during which the switching transistor is fixed to switching-OFF; and a gain controller configured to control the gain and/or the shift of the conversion circuit.

With this configuration, by changing the gain and/or the shift of the conversion circuit, the peak value of the detection voltage $V_{CS}$ in the light load conditions, i.e., the peak value of the current Ip flowing into the switching transistor M1, can be smaller than that in medium and heavy load conditions. This can, in some embodiments, result in suppression of a ringing sound from the transformer and/or reduction of a ripple of an output voltage. In the specification, "gain" may not only be greater than one (amplification) but also less than one (attenuation).

The gain controller may control the conversion circuit based on the feedback voltage. The light load conditions can be monitored with reference to the feedback voltage.

The gain controller may set the conversion circuit to a first state in normal conditions, set the conversion circuit to a second state when the feedback voltage is decreased to a predetermined first threshold, and return the conversion circuit to the first state when the feedback voltage is increased to a second threshold greater than the first threshold. In this case, when the load becomes lighter to some extent, by making the transition to the second state, it is possible to suppress the ringing sound of the transformer and/or educe the output voltage ripple. Thereafter, when the feedback voltage is increased to some extent, i.e., the load becomes heavier to some extent, by returning the conversion circuit to the first state, it is possible to supply sufficient energy to the transformer.

The burst control circuit may control the switching period and the stop period based on at least the feedback voltage. The burst control circuit may stop the switching operation of the switching transistor when the feedback voltage becomes lower than a predetermined third threshold, and resume the switching operation of the switching transistor when the feedback voltage becomes higher than a predetermined fourth threshold when the switching transistor is stopped.

The gain controller may set the conversion circuit to the first state under normal conditions and set the conversion circuit to the second state when the feedback voltage is decreased to the predetermined first threshold. The burst control circuit may stop the switching operation of the switching transistor when the feedback voltage becomes lower than the predetermined third threshold. The third threshold may be equal to the first threshold. In this case, when the light load conditions are monitored and transition to the burst operation is made, it is possible to cause transition of the conversion circuit to the second state.

The gain controller may set the conversion circuit to a third state during a predetermined period when the feedback voltage is increased to the second threshold, and, thereafter, return the conversion circuit to the first state.

The conversion circuit may include an amplifier amplifying the detection voltage with a variable gain. The gain controller may control a gain of the amplifier.

The conversion circuit may include an attenuation circuit attenuating the detection voltage with a variable gain. The gain controller may control a gain of the attenuation circuit.

The pulse modulator may include: a reset signal generator configured to generate a reset signal asserted when the detection voltage passed through the conversion circuit reaches the feedback voltage passed through the conversion circuit; a set signal generator configured to generate a set signal; and a flip-flop configured to generate the pulse signal which transitions to an ON level corresponding to the switching-ON of the switching transistor when the set signal is asserted and transitions to an OFF level corresponding to the switching-OFF of the switching transistor when the reset signal is asserted.

The set signal generator may assert the set signal with a predetermined cycle.

The set signal generator may assert the set signal if there is a lapse of a predetermined OFF time after the reset signal is asserted.

The set signal generator may assert the set signal when energy stored in the transformer is substantially zeroed.

The transformer may further include an auxiliary winding provided at a primary side of the transformer. The control circuit may further include an auxiliary terminal to which a voltage of one end of the auxiliary winding is input. The set signal generator may (i) compare the voltage of the auxiliary terminal with a predetermined threshold voltage, generate a bottom detection signal asserted whenever the voltage of the auxiliary terminal crosses the predetermined threshold voltage, and (ii) assert the set signal whenever the number of times of assertion of the bottom detection signal reaches a count set value.

The transformer may further include an auxiliary winding provided at a primary side of the transformer. The control circuit may further include an auxiliary terminal to which a voltage of one end of the auxiliary winding is input. The set signal generator may (i) compare the voltage of the auxiliary terminal with a predetermined threshold voltage, generates a bottom detection signal asserted whenever the voltage of the auxiliary terminal crosses the predetermined threshold voltage, and (ii) assert the set signal if there is a lapse of a predetermined time after the bottom detection signal is asserted.

The control circuit may be integrated on a single semiconductor substrate. "Integration" may include a case where all circuit elements are formed on a single semiconductor substrate, a case where some main circuit elements are integrated on a single semiconductor, and a case where some resistors, capacitors and so on are formed out of a semiconductor substrate. When the control circuit is integrated into a single IC (Integrated Circuit), a circuit area can be reduced and characteristics of circuit elements can be uniformly maintained.

According to another embodiment of the present disclosure, there is provided a DC/DC converter including: a transformer having a primary winding, a secondary winding and an auxiliary winding; a switching transistor connected to the primary winding of the transformer; a first diode having an anode connected to the secondary winding; a first output capacitor having one grounded end and the other end connected to a cathode of the first diode; a second diode having an anode connected to the auxiliary winding; a second output capacitor having one grounded end and the other end connected to a cathode of the second diode; a feedback circuit configured to generate a feedback voltage corresponding to an output voltage produced in the first output capacitor; and the above-described control circuit configured to receive the feedback voltage and switch the switching transistor.

The feedback circuit may include: a shunt regulator configured to generate a feedback signal having a level regulated such that a difference between a voltage obtained by division of the output voltage and a predetermined target value is zeroed; and a photo coupler having a primary side light emitting device controlled by the feedback signal, wherein a signal produced by a secondary side light receiving device of the photo coupler is supplied, as the feedback signal, to the control circuit.

According to another embodiment of the present disclosure, a power supply includes: a filter configured to filter a commercial AC voltage; a diode rectifier circuit configured to full wave-rectify an output voltage of the filter; a smoothing capacitor configured to generate a DC input voltage by smoothing an output voltage of the diode rectifier circuit; and the above-described DC/DC converter configured to drop the DC input voltage and supply the dropped voltage to a load.

According to another embodiment of the present disclosure, an electronic apparatus includes: a load; a filter configured to filter a commercial AC voltage; a diode rectifier circuit configured to full wave-rectify an output voltage of the filter; a smoothing capacitor configured to generate a DC input voltage by smoothing an output voltage of the diode rectifier circuit; and the above-described DC/DC converter configured to drop the DC input voltage and supply the dropped voltage to the load.

According to another embodiment of the present disclosure, a power adapter includes: a filter configured to filter a commercial AC voltage; a diode rectifier circuit configured to full wave-rectify an output voltage of the filter; a smoothing capacitor configured to generate a DC input voltage by smoothing an output voltage of the diode rectifier circuit; and the above-described DC/DC converter configured to drop the DC input voltage and generate a DC output voltage.

Other aspects of the present disclosures may include any combinations of the above-described elements or conversion of expression of the present disclosure between methods, apparatuses and systems and so on.

DETAILED DESCRIPTION

Figure 1:
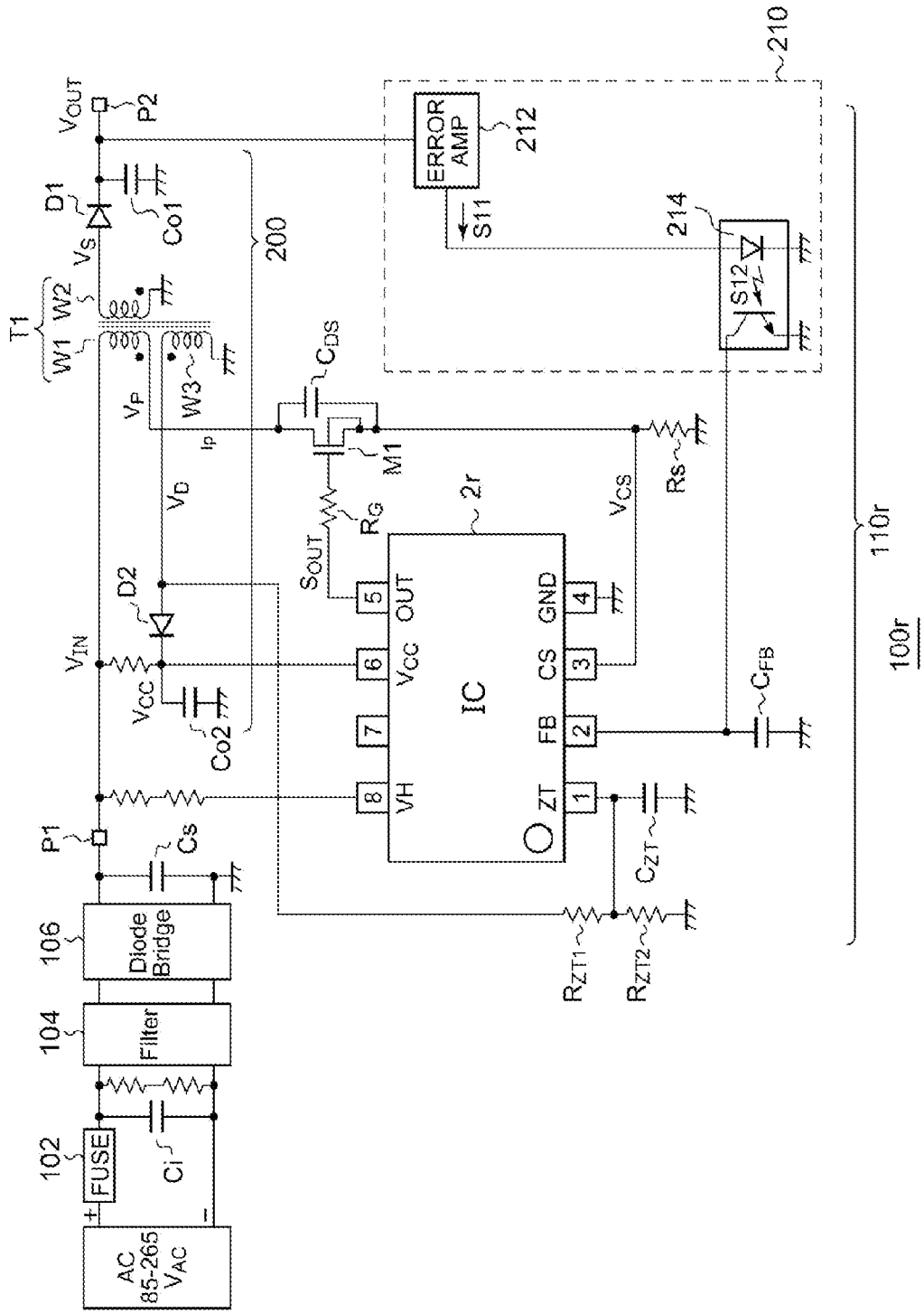
FIG. 1 is a circuit diagram showing a basic configuration of an inverter.
Figure 2:
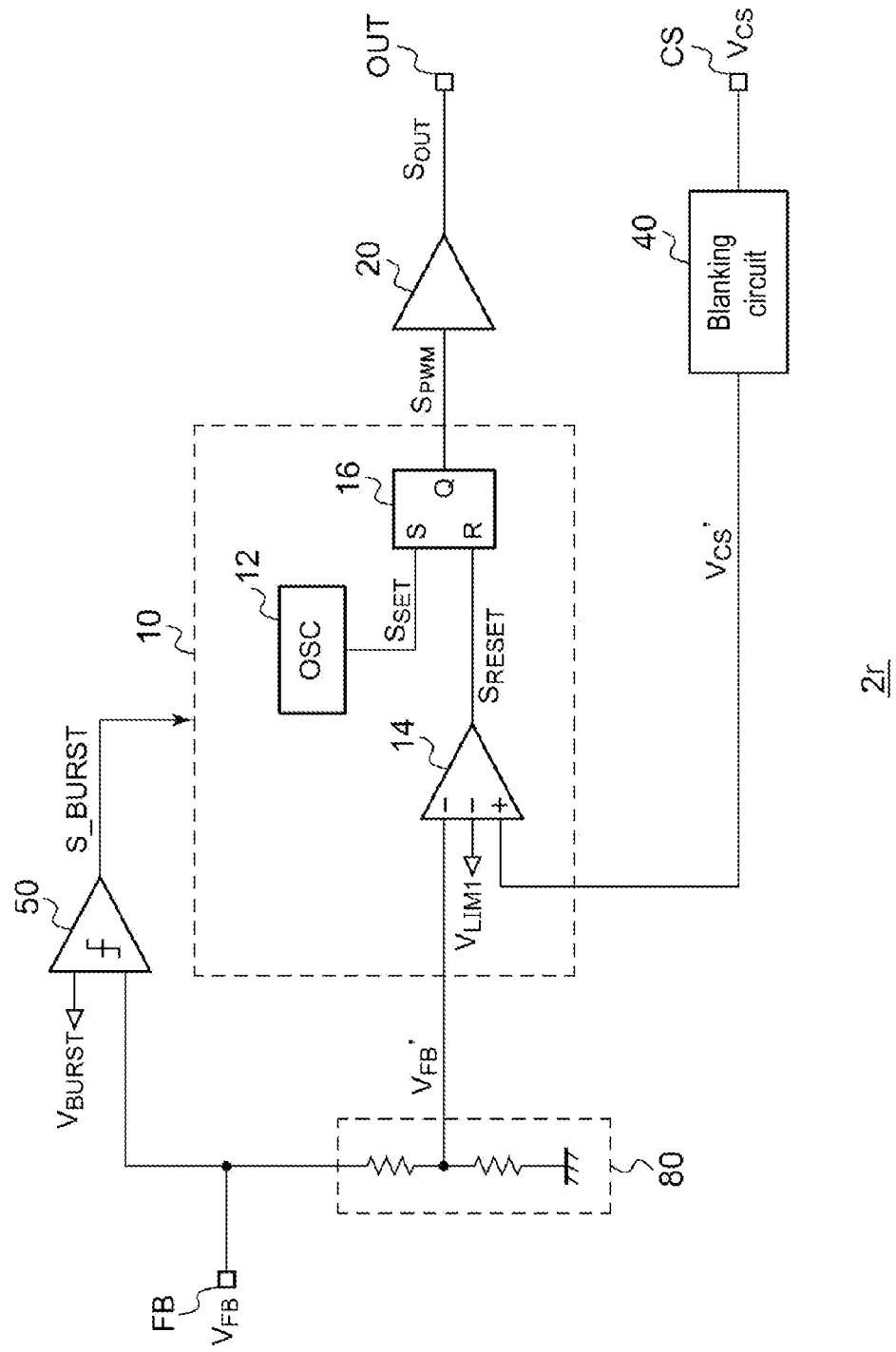
FIG. 2 is a circuit diagram showing a configuration of a control circuit.
Figure 3:
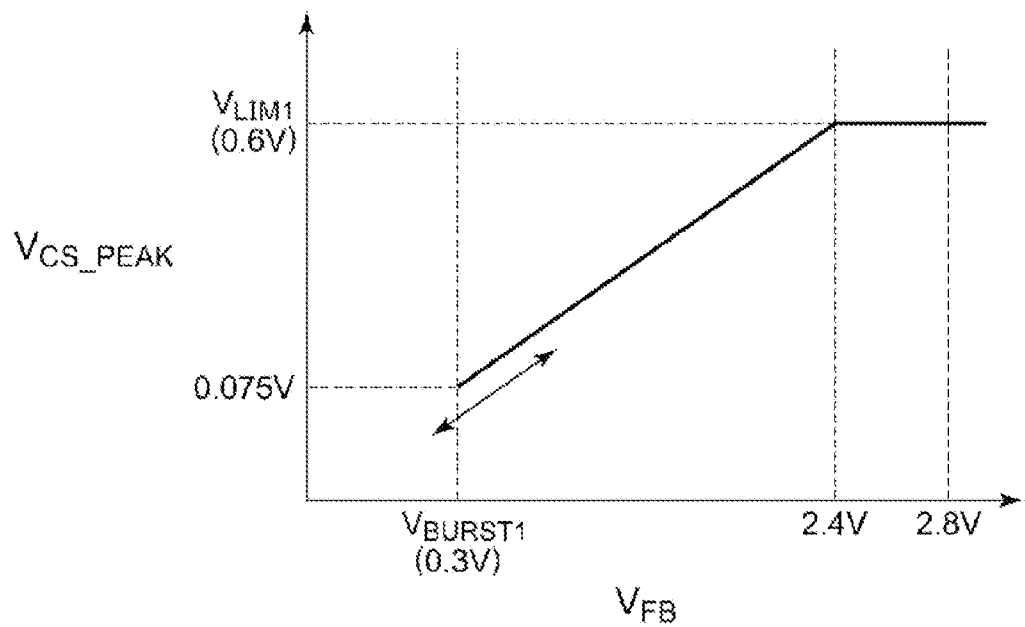
FIG. 3 is a view showing a relationship between a feedback voltage $V_{FB}$ and a peak value $V_{CS\_PEAK}$ of a detection voltage $V_{CS}$ in the control circuit.

Embodiments of the present disclosure will now be described in detail with reference to the drawings. Throughout the drawings, the same or similar elements, members and processes are denoted by the same reference numerals and explanation of which will not be repeated. The disclosed embodiments are provided for the purpose of illustration, not limitation, of the present disclosure and all features and combinations thereof described in the embodiments cannot be necessarily construed to describe the spirit of the present disclosure.

In the specification, the phrase "connection of a member A and a member B" is intended to include direct physical connection of the member A and the member B as well as indirect connection thereof via other member as long as the other member has no substantial effect on the electrical connection of the member A and the member B or has no damage to functions and effects shown by a combination of the member A and the member B. Similarly, the phrase "interposition of a member C between a member A and a member B" is intended to include direct connection of the member A and the member C or direct connection of the member B and the member C as well as indirect connection thereof via other member as long as the other member has no substantial effect on the electrical connection of the member A, the member B and the member C or has no damage to functions and effects shown by a combination of the member A, the member B and the member C.

Figure 5:
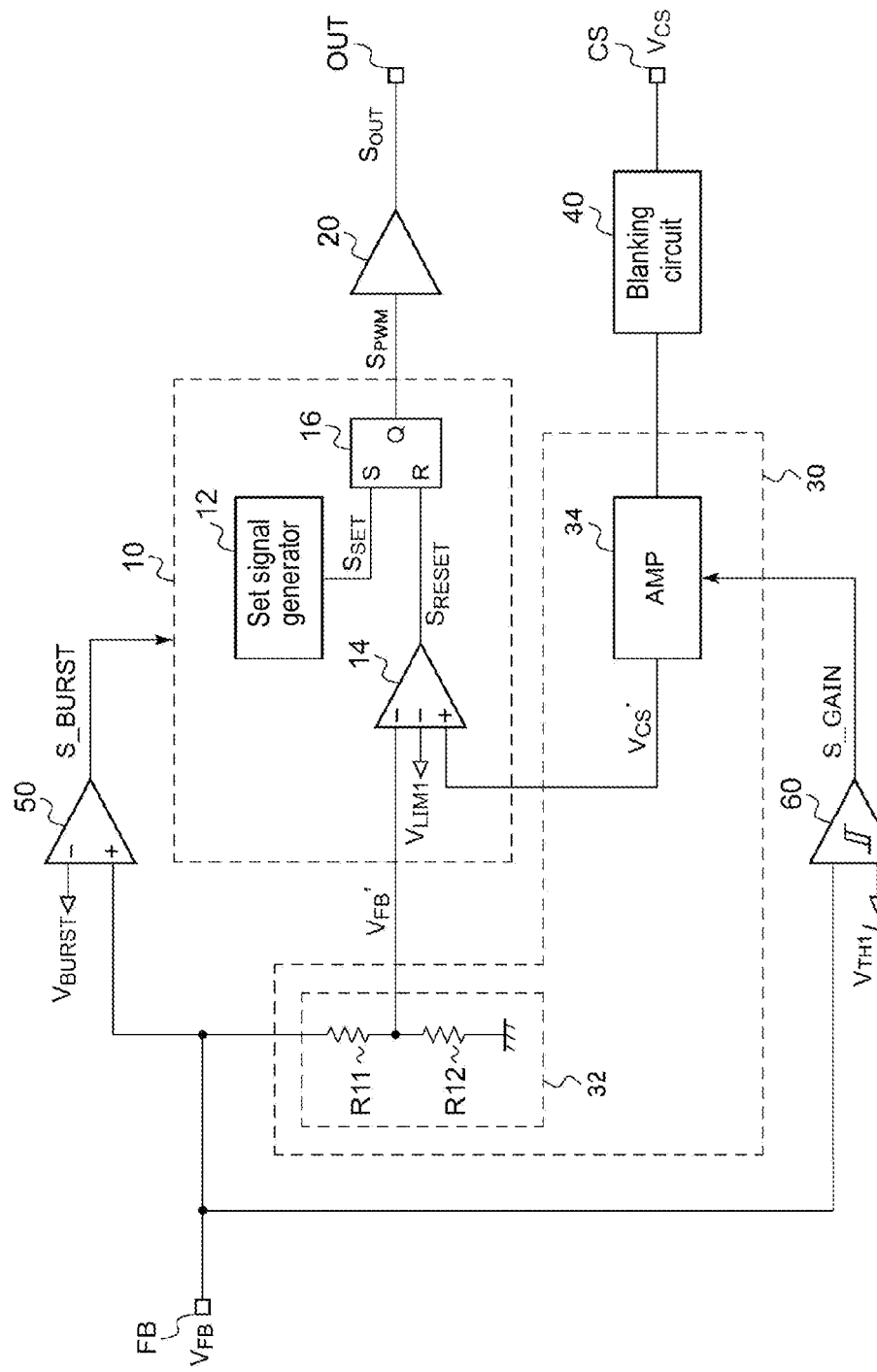
FIG. 5 is a circuit diagram showing a configuration of a control circuit according to an embodiment.
Figure 6:
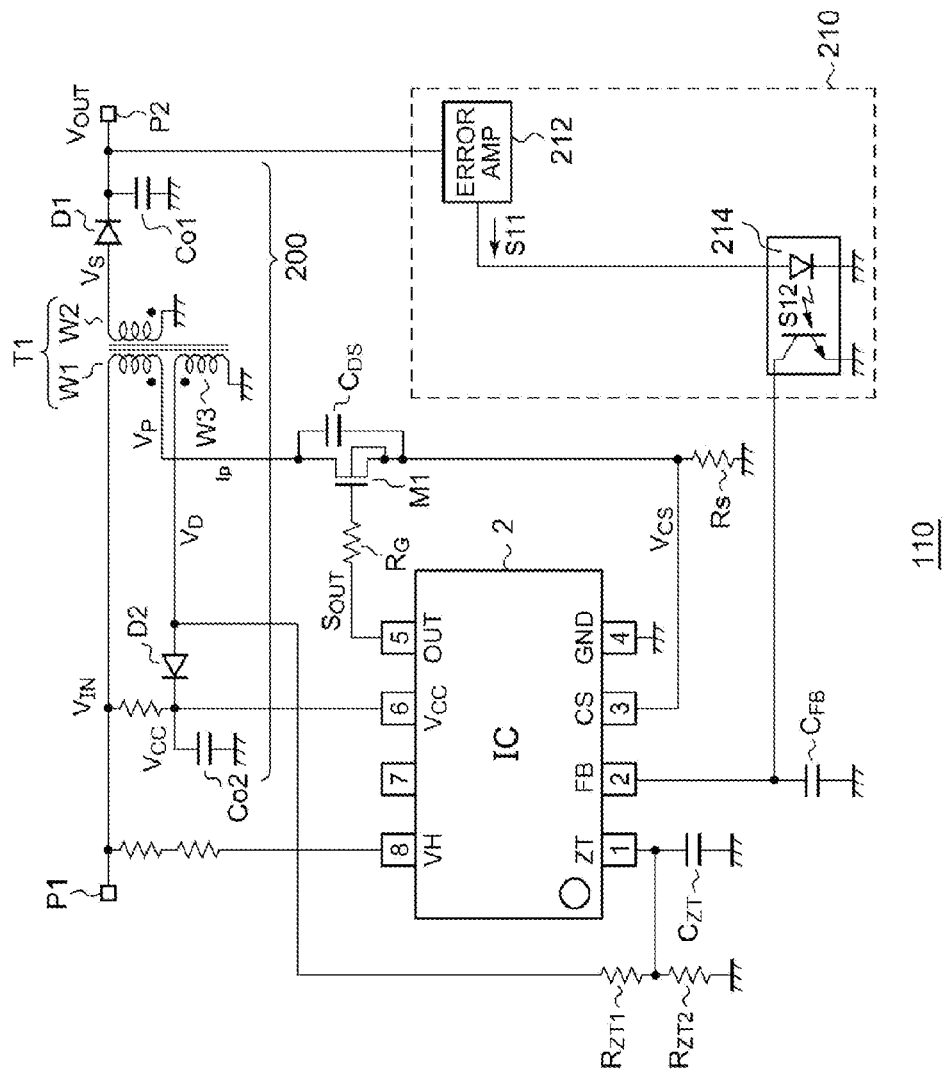
FIG. 6 is a circuit diagram showing a configuration of a DC/DC converter including the control circuit according to the embodiment of FIG. 5.

FIG. 5 is a circuit diagram showing a configuration of a control circuit 2 according to an embodiment, and FIG. 6 is a circuit diagram showing a configuration of a DC/DC converter 110 including the control circuit 2 according to the embodiment. The control circuit 2 shown in FIG. 5 may be used for the DC/DC converter 110 as shown in FIG. 6.

The DC/DC converter 110 includes the control circuit 2, a switching transistor M1, a detection resistor $R_S$, an output circuit 200 and a feedback circuit 210 as shown in FIG. 6. Except the configuration of the control circuit 2, the DC/DC converter 110 in FIG. 6 has the same configurations of the DC/DC converter 110r as shown in FIG. 1 and, therefore, explanation of which is not repeated.

The configuration of the control circuit 2 will now be described. The control circuit 2 may be a functional IC integrated on a single semiconductor substrate and has an auxiliary terminal (ZT terminal), a FB terminal, a CS terminal, a GND terminal, an OUT terminal, a VCC terminal and a VH terminal, as shown in FIG. 6. FIG. 5 shows only the FB terminal, the OUT terminal and the CS terminal, with the remaining terminals not shown.

The control circuit 2 stabilizes a DC output voltage $V_{OUT}$ to a target level by adjusting a duty cycle of a switching operation of the switching transistor M1 of the DC/DC converter 110 based on a detection voltage $V_{CS}$ of the CS terminal and a feedback voltage $V_{FB}$ of the FB terminal. The switching transistor M1 may be integrated into the control circuit 2.

The control circuit 2 includes a pulse modulator 10, a driver 20, a conversion circuit 30, a blanking circuit 40, a burst control circuit 50 and a gain controller 60.

The blanking circuit 40 is provided to remove noise from the detection voltage $V_{CS}$. Specifically, immediately after the switching transistor M1 is switched on, the detection signal $V_{CS}$ is masked during a predetermined blanking interval. The blanking circuit 40 may be omitted.

The conversion circuit 30 amplifies, attenuates and/or level-shifts at least one of the feedback voltage $V_{FB}$ and the detection voltage $V_{CS}$. The conversion circuit 30 is configured to switch between multiple conditions and is set with different gains and/or shifts for different conditions. That is, the gain and/or shifts of the conversion circuit 30 are variable. In this embodiment, amplification/attenuation of at least one of the feedback voltage $V_{FB}$ and the detection voltage $V_{CS}$ will be described. Shift of at least one of the feedback voltage $V_{FB}$ and the detection voltage $V_{CS}$ will be described later in modifications.

For example, the conversion circuit 30 includes a voltage divider 32 and an amplifier 34. The voltage divider 32 divides the feedback voltage $V_{FB}$ with a predetermined division ratio of R12/(R11+R12). That is, a gain $\alpha_{FB}$ for the feedback voltage $V_{FB}$ is R12/(R11+R12). In this embodiment, the gain $\alpha_{FB}$ is ¼.

The amplifier 34 amplifies the detection voltage $V_{CS}$ with a variable gain $\alpha_{CS}$. The gain $\alpha_{CS}$ of the amplifier 34 is configured to switch between at least two values. In this embodiment, the gain $\alpha_{CS}$ may switch between three values, i.e., a first value $\alpha_{CS1}(=1)$, a second value $\alpha_{CS2}(=4)$ and a third value $\alpha_{CS3}(=2)$.

It is here assumed that a state where the gain $\alpha_{CS}$ of the amplifier 34 is the first value $\alpha_{CS1}$ is a first state $\phi 1$, a state where the gain $\alpha_{CS}$ is the second value $\alpha_{CS2}$ is a second state $\phi 2$, and a state where the gain $\alpha_{CS}$ is the third value $\alpha_{CS3}$ is a third state $\phi 3$. It is also assumed that a ratio of the gain $\alpha_{FB}$ for the feedback voltage $V_{FB}$ to the gain $\alpha_{CS}$ for the detection voltage $V_{CS}$ is a conversion ratio $\alpha_{FB}/\alpha_{CS}$.

In this case, the conversion circuit 30 may allow the conversion ratio $\alpha_{FB}/\alpha_{CS}$ to switch between multiple values. Specifically, $\alpha_{FB}/\alpha_{CS1}=\frac{1}{4}$ for the first state $\phi 1$, $\alpha_{FB}/\alpha_{CS2}=\frac{1}{16}$ for the second state $\alpha 2$, and $\alpha_{FB}/\alpha_{CS3}=\frac{1}{8}$ for the third state $\phi 3$.

The conversion ratio $\alpha_{FB}/\alpha_{CS1}$ of the first state $\phi 1$ is determined to supply sufficient power to a load (not shown) under heavy load conditions. On the other hand, the conversion ratio $\alpha_{FB}/\alpha_{CS2}$ of the second state $\phi 2$ is determined to suppress a ringing sound from the transformer T1 and/or lessen a ripple of the output voltage $V_{OUT}$ under light load conditions.

The pulse modulator 10 generates a pulse signal $S_{PWM}$ pulse-modulated to allow the output voltage $V_{OUT}$ of the DC/DC converter 110 to approach a target value, based on a feedback voltage $V_{FB}'$ and a detection voltage $V_{CS}'$ output from the conversion circuit 30. The pulse modulator 10 may be a so-called peak current mode modulator.

The configuration of the pulse modulator 10 is not particularly limited but may use any known techniques. For example, the pulse modulator 10 includes a set signal generator 12, a reset signal generator 14 and a SR flip-flop 16.

The reset signal generator 14 generates a reset signal $S_{RESET}$ asserted when the detection voltage $V_{CS}'$ output from the conversion circuit 30 reaches the feedback voltage $V_{FB}'$ output from the conversion circuit 30. For example, the reset signal generator 14 asserts (having a high level) the reset signal $S_{RESET}$ if the detection voltage $V_{CS}'$ is higher than a lower one of the feedback voltage $V_{FB}'$ and the upper limit voltage $V_{LIM1}$.

The set signal generator 12 generates a set signal $S_{SET}$. For example, the set signal generator 12 may include an oscillator which asserts (having a high level) the set signal $S_{SET}$ every predetermined cycle.

As an alternative, the set signal generator 12 may assert the set signal $S_{SET}$ if there is a lapse of a predetermined OFF time $T_{OFF}$ after the reset signal $S_{RESET}$ is asserted.

As another alternative, the set signal generator 12 may asserts the set signal $S_{SET}$ when energy stored in the transformer T1 is substantially zeroed (being referred to as quasi-resonance control).

For the quasi-resonance control, in some embodiments, the set signal generator 12 may be composed of a comparator and a counter (not shown). A voltage of one end of the auxiliary winding W3 is divided and input to the ZT terminal. The comparator compares the voltage of the one end of the auxiliary winding W3, which is input to the ZT terminal, with a predetermined threshold voltage and asserts a bottom detection signal whenever the voltage of the ZT terminal crosses the threshold voltage. The counter may assert the set signal $S_{SET}$ when the number of times by which the bottom detection signal is asserted reaches a set value.

For the quasi-resonance control, in other embodiments, the set signal generator 12 may be composed of a comparator and a timer (not shown). The comparator compares the voltage of the ZT terminal with a predetermined threshold voltage and generates a bottom detection signal asserted whenever the voltage of the ZT terminal crosses the threshold voltage. The timer asserts the set signal $S_{SET}$ if there is a lapse of a predetermined time after the bottom detection signal is asserted.

The set signal $S_{SET}$ generated by the set signal generator 12 is input to the set terminal S of the SR flip-flop 16. The pulse signal $S_{PWM}$ as an output of the SR flip-flop 16 transitions to an ON level (high level) corresponding to the switching-ON of the switching transistor M1 when the set signal $S_{SET}$ is asserted, and transitions to an OFF level (low level) corresponding to the switching-OFF of the switching transistor M1 when the reset signal $S_{RESET}$ is asserted.

The driver 20 drives the switching transistor M1 connected to the OUT terminal based on the pulse signal $S_{PWM}$.

The burst control circuit 50 detects light load conditions. For example, the burst control signal 50 includes a comparator (not shown) to compare the feedback voltage $V_{FB}$ with a predetermined first burst threshold (also referred to as a third threshold) $V_{BURST1}$. When the feedback voltage $V_{FB}$ becomes lower than the third threshold $V_{BURST1}$, the burst control circuit 50 asserts (having a high level) a light load detection signal S_BURST. When the light load detection signal S_BURST is asserted, the pulse modulator 10 fixes the pulse signal $S_{PWM}$ to an OFF level (low level) and stops the switching operation of the switching transistor M1.

In addition, the burst control circuit 50 compares the feedback voltage $V_{FB}$ with a predetermined second burst threshold (also referred to as a fourth threshold) $V_{BURST2}$. When the feedback voltage $V_{FB}$ becomes lower than the fourth threshold $V_{BURST2}$, the burst control circuit 50 negates (having a low level) the light load detection signal S_BURST. In this embodiment, the fourth threshold $V_{BURST2}$ is set to be higher than the third threshold $V_{BURST1}$. In this case, the burst control circuit 50 may be configured using a hysteresis comparator.

The gain controller 60 changes the gain and/or shift of the above-described conversion circuit 30. That is, the gain controller 60 controls a state of the conversion circuit 30.

In more detail, the gain controller 6 controls the conversion circuit 30 based on the feedback voltage $V_{FB}$. For example, the gain controller 60 includes a comparator (not shown) to compare the feedback voltage $V_{FB}$ with at least one predetermined threshold. The gain controller 60 sets the conversion circuit 30 to the first state $\phi 1$ in a normal state (medium load to heavy load) under which some degree of load current flows. When the feedback voltage $V_{FB}$ is decreased to a predetermined first threshold $V_{TH1}$, the gain controller 60 sets the conversion circuit 30 to the second state $\phi 2$. Thereafter, when the feedback voltage $V_{FB}$ is increased to a second threshold $V_{TH2}$, which is greater than the first threshold $V_{TH1}$, the gain controller 60 returns the conversion circuit 30 to the first state $\phi 1$.

In this embodiment, the first threshold $V_{TH1}$ is equal to the third threshold $V_{BURST1}$. That is, while the light load conditions are detected and the control circuit 2 transitions to the burst operation, the gain controller 60 sets the conversion circuit 30 to the second state $\phi 2$.

The gain controller 60 generates a control signal S_GAIN based on a result of the comparison between the feedback voltage $V_{FB}$ and the thresholds $V_{TH1}$ and $V_{TH2}$. The state of the conversion circuit 30 is switched according to the control signal S_GAIN. The gain controller 60 may be configured with a hysteresis comparator having two thresholds $V_{TH1}$ and $V_{TH2}$.

In some embodiments, when the feedback voltage $V_{FB}$ is increased to the second threshold $V_{TH2}$, the gain controller 60 sets the conversion circuit 30 to the third state φ3 during a certain period, particularly a period of several hundred μs to several ms (for example, 500 μs), and, thereafter, sets the conversion circuit 30 to the second state φ2.

Figure 7:
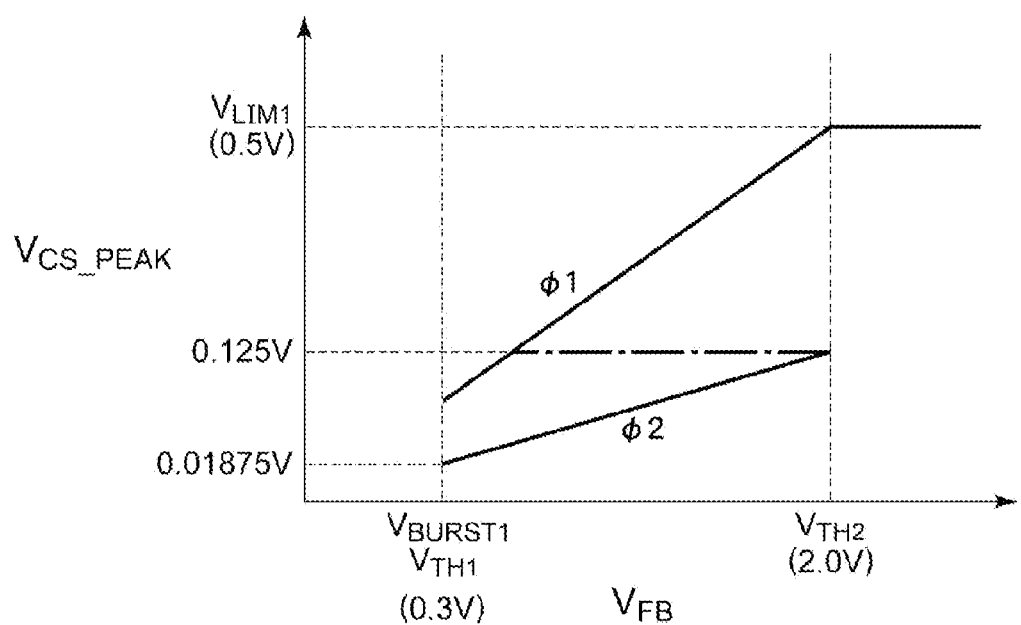
FIG. 7 is a view showing a relationship between a feedback voltage $V_{FB}$ and a peak value $V_{CS\_PEAK}$ of a detection voltage $V_{CS}$ in the control circuit of FIG. 5.

Subsequently, an operation of the control circuit 2 will be described. FIG. 7 is a view showing a relationship between the feedback voltage $V_{FB}$ and the peak value $V_{CS\_PEAK}$ of the detection voltage $V_{CS}$ in the control circuit 2 of FIG. 5. In the first state φ1, the relationship of $V_{CS\_PEAK}=V_{FB}\times\alpha_{FB}/\alpha_{CS1}=V_{FB}\times\frac{1}{4}$ is established.

When the feedback voltage $V_{FB}$ is decreased to the third threshold $V_{BURST1}$, the light load conditions are detected and the control circuit 2 transitions to the burst operation. At the same time, the conversion circuit 30 is switched to the second state φ2. In the second state φ2, the relationship of $V_{CS\_PEAK}=V_{FB}\times\alpha_{FB}/\alpha_{CS2}=V_{FB}\times\frac{1}{16}$ is established. In the second state φ2, when the feedback voltage $V_{FB}$ is decreased to the second threshold $V_{TH2}$, the conversion circuit 30 returns to the first state φ1.

Figure 8:
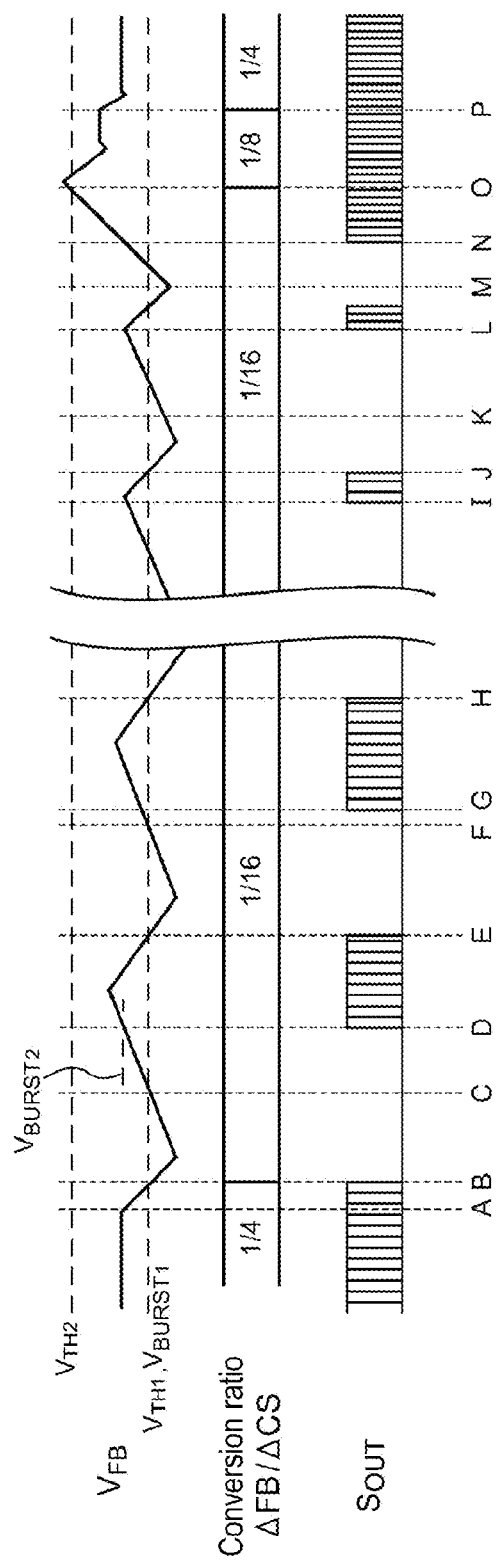
FIG. 8 is a waveform diagram showing an operation of the DC/DC converter of FIG. 6.

FIG. 8 is a waveform diagram showing an operation of the DC/DC converter 110 of FIG. 6. Prior to time A, the DC/DC converter 110 is operated in the normal state, the conversion circuit 30 has the first state φ1 and the conversion ratio $\alpha_{FB}/\alpha_{CS}$ is ¼.

At time A, a load (not shown) lightens and the feedback voltage $V_{FB}$ begins to be decreased. At time B, when the feedback voltage $V_{FB}$ is decreased to the third threshold $V_{BURST1}$, the switching operation stops. At the same time, the conversion circuit 30 has the second state φ2 and the conversion ratio $\alpha_{FB}/\alpha_{CS}$ becomes 1/16.

The output voltage $V_{OUT}$ (not shown) is increased by switching operation of the switching transistor M1 in the period from time A to time B, and, accordingly, the feedback voltage $V_{FB}$ is decreased. After time B, when the switching operation of the switching transistor M1 is stopped, the output voltage $V_{OUT}$ is decreased and the feedback voltage $V_{FB}$ is increased. At time D, when the feedback voltage $V_{FB}$ is increased to the fourth threshold $V_{BURST2}$, a switching period arrives. Thereafter, the burst operation lasts during a period from time D to time L. Meanwhile, the conversion circuit 30 also remains in the second state φ2.

At time M, the load gets heavy. When the load gets heavy, the output voltage $V_{OUT}$ is decreased and the feedback voltage $V_{FB}$ begins to be increased. At time N, the feedback voltage $V_{FB}$ exceeds the fourth threshold $V_{BURST2}$. At time O, when the feedback voltage $V_{FB}$ reaches the second threshold $V_{TH2}$, the conversion circuit 30 has the third state φ3 and the conversion ratio $\alpha_{FB}/\alpha_{CS}$ becomes ⅛ during a period (500 μs) from time O to time P. At time P, the conversion circuit 30 has the first state φ1 and the conversion ratio $\alpha_{FB}/\alpha_{CS}$ becomes ¼.

Figure 4:
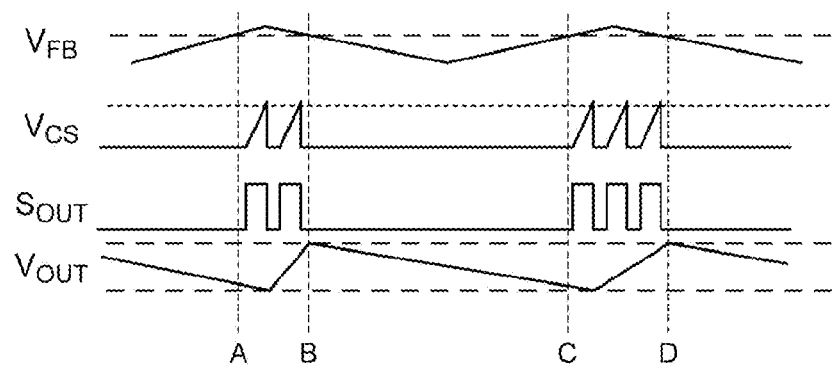
FIG. 4 is a waveform diagram showing an operation of a DC/DC converter under light load conditions.
Figure 9:
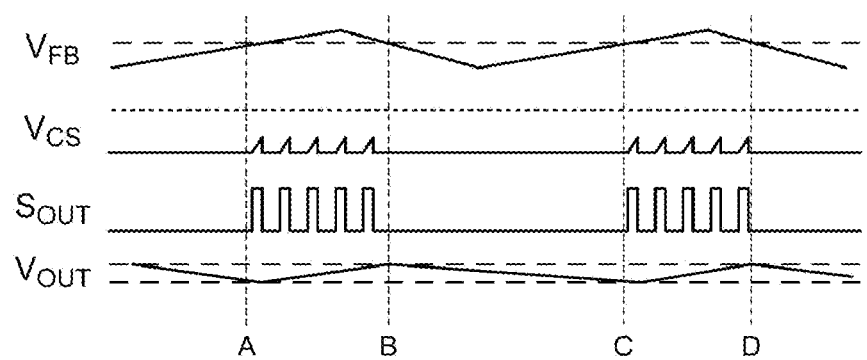
FIG. 9 is a waveform diagram showing an operation of the DC/DC converter of FIG. 6 under light load conditions.

FIG. 9 is a waveform diagram showing an operation of the DC/DC converter 110 of FIG. 6 under the light load conditions. In the control circuit 2 of FIG. 5, since the conversion ratio $\alpha_{FB}/\alpha_{CS}$ becomes small, the peak value of the detection voltage $V_{CS}$, i.e., the peak value of the current Ip, can be further reduced as compared to that in FIG. 4 showing a fixed conversion ratio.

As a result, variation of the magnetic flux density of the transformer T1 can be suppressed and a ringing sound can be suppressed. In addition, as shown in FIG. 9, since the amplitude of the detection voltage $V_{CS}$ (or the coil current Ip) becomes small, a current supplied to the output capacitor Co1 during one switching period in the burst operation becomes small. As a result, a ripple of the output voltage $V_{OUT}$ can be reduced.

In addition, when the conversion circuit 30 returns from the second state φ2 to the first state φ1, if the variation of the conversion ratio $\alpha_{FB}/\alpha_{CS}$ is too large, the conversion circuit 30 may shuttle between the first state φ1 and the second state φ2, which may result in instability of the DC/DC converter 100. In this case, the DC/DC converter 100 can be stabilized by inserting the third state φ3.

Subsequently, usage of the DC/DC converter 110 will be described.

The DC/DC converter 110 is suitable to be used for the inverter (power supply) 100 as shown in FIG. 1. The inverter 100 is suitable to be used for power blocks of an AC adapter and an electronic apparatus.

Figure 10:
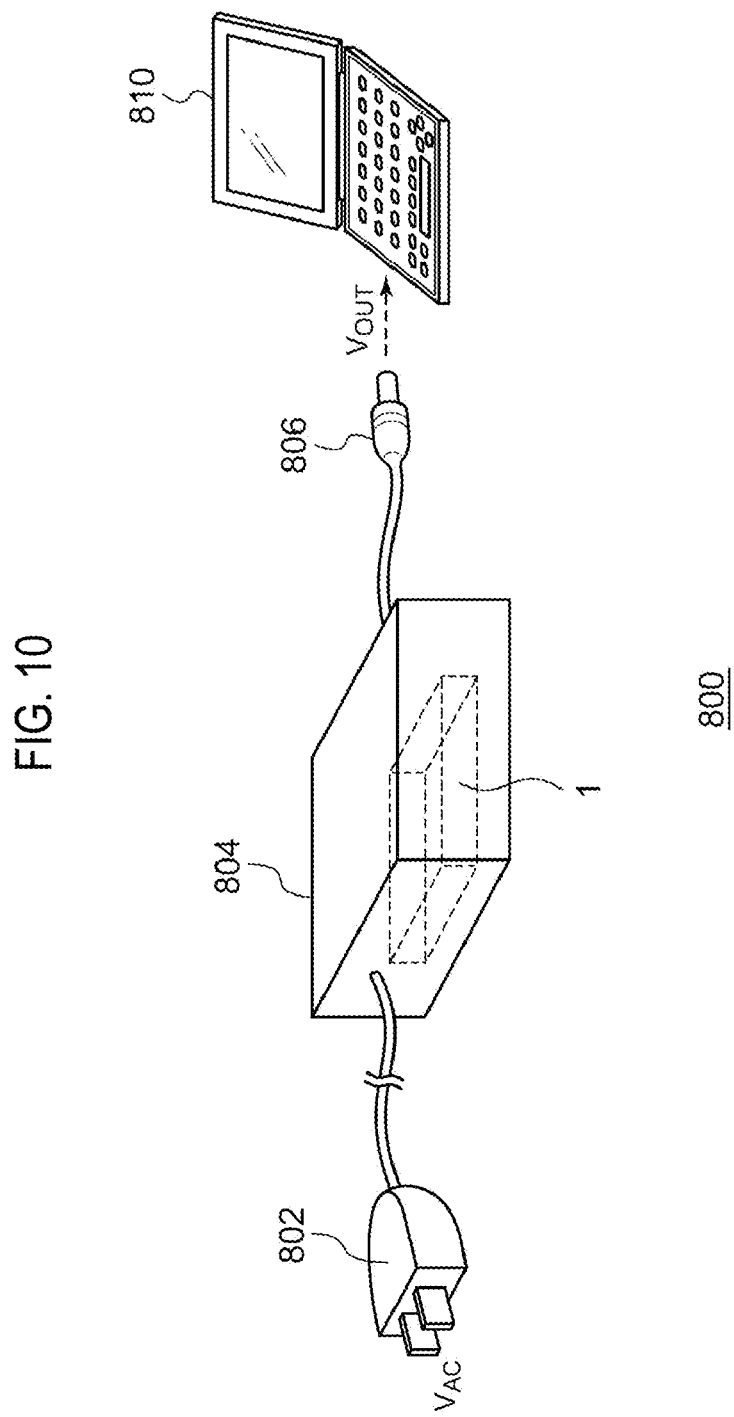
FIG. 10 is a view showing an AC adapter including an inverter.

FIG. 10 is a view showing an AC adapter 800 including the inverter 100. The AC adapter 800 includes a plug 802, a housing 804 and a connector 806. The plug 802 receives a commercial AC voltage $V_{AC}$ from an electrical socket (not shown). The inverter 100 is mounted within the housing 804. A DC output voltage $V_{OUT}$ generated by the inverter 100 is supplied from the connector 806 into an electronic apparatus 810. Examples of the electronic apparatus 810 may include a notebook PC, a digital camera, a digital video camera, a mobile phone, a portable audio player and the like.

Figure 11A:
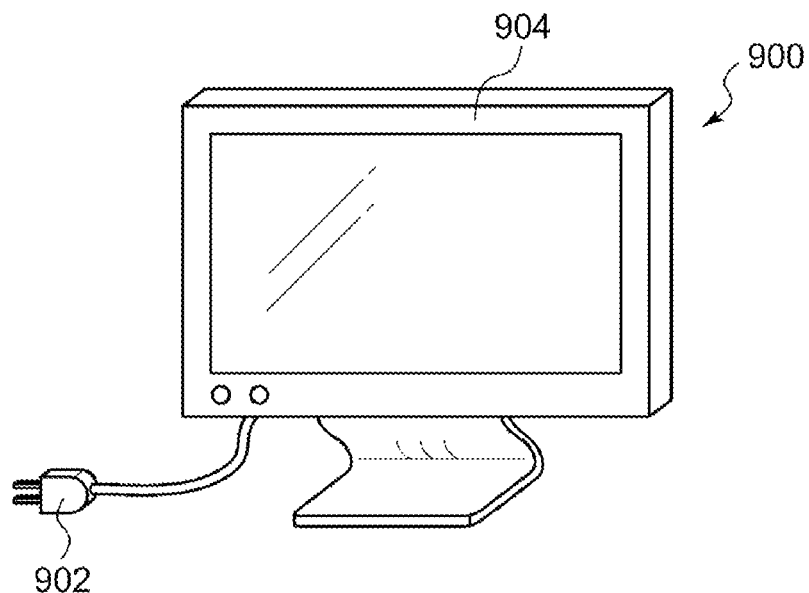
FIGS. 11A and 11B are views showing an electronic apparatus including an inverter.
Figure 11B:
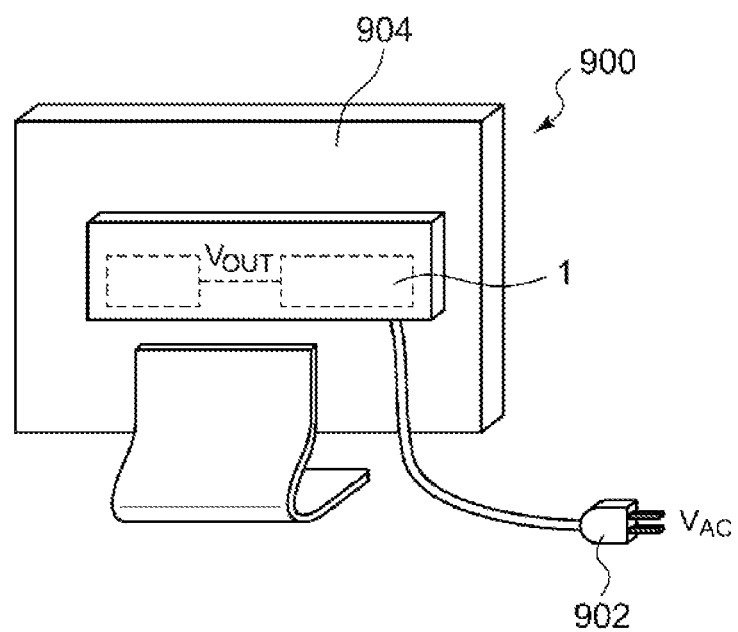

FIGS. 11A and 11B are views showing an electronic apparatus 900 including the inverter 100. Although it is illustrated that the electronic apparatus 900 is a display apparatus in FIGS. 11A and 11B, the electronic apparatus 900 is not particularly limited but may be any apparatus incorporating a power supply, such as an audio apparatus, a refrigerator, a washing machine, a vacuum cleaner and the like. A plug 902 receives a commercial AC voltage $V_{AC}$ from an electrical socket (not shown). The inverter 100 is mounted within a housing 904. A DC output voltage $V_{OUT}$ generated by the inverter 100 is supplied to a load (not shown) mounted within the same housing 904, such as a microcomputer, a DSP (Digital Signal Processor), a power supply circuit, an illumination apparatus, an analog circuit, a digital circuit or the like.

Heretofore, the present disclosure has been described by way of specific embodiments. The disclosed embodiments are merely examples and it is to be understood by those skilled in the art that combinations of elements and processes of the embodiments can be modified in various ways and such modification falls within the scope of the present disclosure. The following description is given to such modification.

(First Modification)

Although it has been illustrated in the above embodiment that the gain of the amplifier 34 is changed, the present disclosure is not limited thereto. For example, instead of or in addition to the gain of the amplifier 34, the conversion ratio $\alpha_{FB}/\alpha_{CS}$ may be controlled by making the division ratio (i.e., the gain $\alpha_{FB}$) of the voltage divider 32 variable and changing this division ratio. For example, with the gain of the amplifier 34 fixed to one (the amplifier may be omitted), the division ratio $\alpha_m$ is set to a first value (¼) in the first state φ1 and a second value (1/16) in the second state φ2.

(Second Modification)

The conversion circuit 30 may include a level shift circuit (not shown) to shift at least one of the feedback voltage $V_{FB}$ and the detection voltage $V_{CS}$. For example, the level shift circuit may be disposed on a path of the detection voltage $V_{CS}$ and may shift the detection voltage $V_{CS}$ to a higher potential in the second state φ2 than in the first state φ1. This can also reduce the peak current of the coil current Ip during the burst operation. In this case, the amplifier 34 may be omitted.

As an alternative, the level shift circuit may be disposed on a path of the feedback voltage $V_{FB}$ and may shift the feedback voltage $V_{FB}$ to a lower potential in the second state φ2 than in the first state φ1. This can also reduce the peak current of the coil current Ip during the burst operation.

As another alternative, the feedback voltage $V_{FB}$ and the detection voltage $V_{CS}$ may be relatively shifted by changing an input offset voltage of the comparator (reset signal generator) 14 intentionally.

The shift and the gain may be controlled in combination.
(Third Modification)

Although it has been illustrated in the above embodiment that the shunt regulator (error amplifier) 212 is disposed at the secondary side of the transformer T1, an error amplifier (not shown) may be disposed at the primary side thereof or may be incorporated into the control circuit 2.
(Fourth Modification)

The configuration of the burst control circuit 50 is not limited to that described above but may use other known techniques capable of controlling the burst operation.
(Fifth Modification)

Although the switching between the first state φ1 and the second state φ2 has been illustrated in the above embodiment, the present disclosure is not limited thereto but may provide more switchable states. In this case, a current peak value may be changed step by step depending on the magnitude of load current.
(Sixth Modification)

Although it has been illustrated in the above embodiment that the circuits described are constructed by a positive logic (high-active) system in which assertion of each signal is assigned with a high level and negation thereof is assigned with a low level, the circuits may be constructed by a negative logic system or a combination of a positive logic system and a negative logic system.

According to the present disclosure in some embodiments, the DC/DC converter can be used in a variety of environments.

While certain embodiments have been described, these embodiments have been presented by way of example only, and are not intended to limit the scope of the disclosures. Indeed, the novel methods and apparatuses described herein may be embodied in a variety of other forms; furthermore, various omissions, substitutions and changes in the form of the embodiments described herein may be made without departing from the spirit of the disclosures. The accompanying claims and their equivalents are intended to cover such forms or modifications as would fall within the scope and spirit of the disclosures.

What is claimed is:

1. A control circuit of a DC/DC converter including a transformer having a primary winding and a secondary winding, a switching transistor disposed on a current path of the primary winding of the transformer, and a detection resistor connected to the switching transistor, the control circuit comprising:
   a feedback terminal receiving a feedback voltage corresponding to an output voltage of the DC/DC converter;
   a current detection terminal receiving a detection voltage generated in the detection resistor;
   a conversion circuit configured to amplify, attenuate and/or level-shift at least one of the feedback voltage and the detection voltage, wherein a gain and/or a shift of the conversion circuit are variable;
   a pulse modulator configured to generate a pulse signal pulse-modulated such that the output voltage of the DC/DC converter approaches a target value, based on the feedback voltage and the detection voltage passed through the conversion circuit;
   a driver configured to drive the switching transistor based on the pulse signal;
   a burst control circuit configured to control a switching period during which the switching transistor is switched and a stop period during which the switching transistor is fixed to switching-OFF; and
   a gain controller configured to control the gain and/or the shift of the conversion circuit,
   wherein the gain controller sets the conversion circuit to a first state in which a gain of the conversion circuit is a first gain under normal conditions, set the conversion circuit to a second state in which the gain of the conversion circuit is a second gain greater than the first gain when the feedback voltage is decreased to a predetermined first threshold, set the conversion circuit to a third state in which the gain of the conversion circuit is a third gain greater than the first gain and smaller than the second gain during a predetermined period when the feedback voltage is increased to a second threshold greater than the first threshold, and, thereafter, returns the conversion circuit to the first state.

2. The control circuit of claim 1, wherein the gain controller controls the conversion circuit based on the feedback voltage.

3. The control circuit of claim 1, wherein the burst control circuit controls the switching period and the stop period based on at least the feedback voltage.

4. The control circuit of claim 3, wherein the burst control circuit stops the switching operation of the switching transistor when the feedback voltage becomes lower than a predetermined third threshold, and resumes the switching operation of the switching transistor when the feedback voltage becomes higher than a predetermined fourth threshold under conditions where the switching transistor is stopped.

5. The control circuit of claim 1, wherein the gain controller sets the conversion circuit to the first state under normal conditions and sets the conversion circuit to the second state when the feedback voltage is decreased to the predetermined first threshold, and
   wherein the burst control circuit stops the switching operation of the switching transistor when the feedback voltage becomes lower than the predetermined third threshold equal to the first threshold.

6. The control circuit of claim 1, wherein the conversion circuit includes an amplifier amplifying the detection voltage with a variable gain, and
   wherein the gain controller controls a gain of the amplifier.

7. The control circuit of claim 1, wherein the conversion circuit includes an attenuation circuit attenuating the detection voltage with a variable gain, and
   wherein the gain controller controls a gain of the attenuation circuit.

8. The control circuit of claim 1, wherein the pulse modulator includes:
   a reset signal generator configured to generate a reset signal asserted when the detection voltage passed through the conversion circuit reaches the feedback voltage passed through the conversion circuit;

a set signal generator configured to generate a set signal; and a flip-flop configured to generate the pulse signal which transitions to an ON level corresponding to the switching-ON of the switching transistor when the set signal is asserted and transitions to an OFF level corresponding to the switching-OFF of the switching transistor when the reset signal is asserted.

9. The control circuit of claim 8, wherein the set signal generator asserts the set signal with a predetermined cycle.

10. The control circuit of claim 8, wherein the set signal generator asserts the set signal if there is a lapse of a predetermined OFF time after the reset signal is asserted.

11. The control circuit of claim 8, wherein the set signal generator asserts the set signal when energy stored in the transformer is substantially zeroed.

12. The control circuit of claim 8, wherein the transformer further includes an auxiliary winding provided at a primary side of the transformer,
wherein the control circuit further includes an auxiliary terminal to which a voltage of one end of the auxiliary winding is input, and
wherein the set signal generator compares the voltage of the auxiliary terminal with a predetermined threshold voltage, generates a bottom detection signal asserted whenever the voltage of the auxiliary terminal crosses the predetermined threshold voltage, and asserts the set signal whenever the number of times of assertion of the bottom detection signal reaches a count set value.

13. The control circuit of claim 8, wherein the transformer further includes an auxiliary winding provided at a primary side of the transformer,
wherein the control circuit further includes an auxiliary terminal to which a voltage of one end of the auxiliary winding is input, and
wherein the set signal generator compares the voltage of the auxiliary terminal with a predetermined threshold voltage, generates a bottom detection signal asserted whenever the voltage of the auxiliary terminal crosses the predetermined threshold voltage, and asserts the set signal if there is a lapse of a predetermined time after the bottom detection signal is asserted.

14. The control circuit of claim 1, wherein the control circuit is integrated on a single semiconductor substrate.

15. The control circuit of claim 1, wherein the gain controller includes a hysteresis comparator configured to compare the feedback voltage received from the feedback terminal with the first threshold and the second threshold to change the gain and/or the shift of the conversion circuit.

16. A DC/DC converter comprising:
a transformer having a primary winding, a secondary winding and an auxiliary winding;
a switching transistor connected to the primary winding of the transformer;
a first diode having an anode connected to the secondary winding;
a first output capacitor having one grounded end and the other end connected to a cathode of the first diode;
a detection resistor connected to the switching transistor;
a second diode having an anode connected to the auxiliary winding;
a second output capacitor having one grounded end and the other end connected to a cathode of the second diode;
a feedback circuit configured to generate a feedback voltage corresponding to an output voltage of the DC/DC converter, the output voltage being produced in the first output capacitor; and
a control circuit configured to receive the feedback voltage and switch the switching transistor,
wherein the control circuit comprises:
a feedback terminal receiving the feedback voltage corresponding to the output voltage of the DC/DC converter;
a current detection terminal receiving a detection voltage generated in the detection resistor;
a conversion circuit configured to amplify, attenuate and/or level-shift at least one of the feedback voltage and the detection voltage, wherein a gain and/or a shift of the conversion circuit are variable;
a pulse modulator configured to generate a pulse signal pulse-modulated such that the output voltage of the DC/DC converter approaches a target value, based on the feedback voltage and the detection voltage passed through the conversion circuit;
a driver configured to drive the switching transistor based on the pulse signal;
a burst control circuit configured to control a switching period during which the switching transistor is switched and a stop period during which the switching transistor is fixed to switching-OFF; and
a gain controller configured to control the gain and/or the shift of the conversion circuit,
wherein the gain controller sets the conversion circuit to a first state in which a gain of the conversion circuit is a first gain under normal conditions, set the conversion circuit to a second state in which the gain of the conversion circuit is a second gain greater than the first gain when the feedback voltage is decreased to a predetermined first threshold, set the conversion circuit to a third state in which the gain of the conversion circuit is a third gain greater than the first gain and smaller than the second gain during a predetermined period when the feedback voltage is increased to a second threshold greater than the first threshold, and, thereafter, returns the conversion circuit to the first state.

17. The DC/DC converter of claim 16, wherein the feedback circuit includes:
a shunt regulator configured to generate a feedback signal having a level regulated such that a difference between a voltage obtained by division of the output voltage and a predetermined target value is zeroed; and
a photo coupler having a primary side light emitting device controlled by the feedback signal,
wherein a signal produced by a secondary side light receiving device of the photo coupler is supplied, as the feedback signal, to the control circuit.

18. A power supply comprising:
a filter configured to filter a commercial AC voltage;
a diode rectifier circuit configured to full wave-rectify an output voltage of the filter;
a smoothing capacitor configured to generate a DC input voltage by smoothing an output voltage of the diode rectifier circuit; and
the DC/DC converter of claim 16, which is configured to drop the DC input voltage by switching the switching transistor and supply the dropped voltage to a load.

19. An electronic apparatus comprising:
a load;
a filter configured to filter a commercial AC voltage;
a diode rectifier circuit configured to full wave-rectify an output voltage of the filter;

a smoothing capacitor configured to generate a DC input voltage by smoothing an output voltage of the diode rectifier circuit; and the DC/DC converter of claim 16, which is configured to drop the DC input voltage by switching the switching transistor and supply the dropped voltage to the load.

20. A power adapter comprising:

a filter configured to filter a commercial AC voltage;

a diode rectifier circuit configured to full wave-rectify an output voltage of the filter;

a smoothing capacitor configured to generate a DC input voltage by smoothing an output voltage of the diode rectifier circuit; and the DC/DC converter of claim 16, which is configured to drop the DC input voltage by switching the switching transistor and generate a DC output voltage.

\* \* \* \* \*